United States Patent
Ma et al.

(10) Patent No.: US 12,252,793 B2
(45) Date of Patent: *Mar. 18, 2025

(54) METHOD FOR MAKING HIGH LUBRICITY ABRADABLE MATERIAL AND ABRADABLE COATING

(71) Applicant: METAL IMPROVEMENT COMPANY, LLC, Paramus, NJ (US)

(72) Inventors: Xinqing Ma, Willington, CT (US); Richard Bajan, Wellford, SC (US); Peter F. Ruggiero, Westerly, RI (US)

(73) Assignee: METAL IMPROVEMENT COMPANY, LLC, Paramus, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/129,444

(22) Filed: Mar. 31, 2023

(65) Prior Publication Data

US 2023/0235440 A1 Jul. 27, 2023

Related U.S. Application Data

(63) Continuation of application No. 17/007,820, filed on Aug. 31, 2020, now Pat. No. 11,674,210.

(51) Int. Cl.
*C23C 4/06* (2016.01)
*B22F 1/10* (2022.01)
(Continued)

(52) U.S. Cl.
CPC .................. *C23C 4/06* (2013.01); *B22F 1/10* (2022.01); *B22F 3/115* (2013.01); *C09D 5/032* (2013.01);
(Continued)

(58) Field of Classification Search
CPC ........... C23C 4/06; C23C 4/134; C23C 4/067; C23C 4/129; B22F 1/10; B22F 3/115;
(Continued)

(56) References Cited

U.S. PATENT DOCUMENTS 3,655,425 A 4/1972 Long et al.
5,122,182 A 6/1992 Dorfman et al.
(Continued)

FOREIGN PATENT DOCUMENTS

EP 0487273 A1 5/1992
JP 2009-228108 A 10/2009
(Continued)

OTHER PUBLICATIONS

K. Hajmrle et al., "Abradable Seals for Gas Turbines and Other Rotary Equipment", Proceedings of ASME Turbo Expo 2004, Power for Land, Sea and Air, ASME GT2004-53865, pp. 1-10, Jun. 2004.

International Search Report and the Written Opinion of the International Searching Authority for International PCT Patent Application No. PCT/US2021/043378, Nov. 22, 2021 (mailing date).

*Primary Examiner* — Dah-Wei D. Yuan
*Assistant Examiner* — Nga Leung V Law
(74) *Attorney, Agent, or Firm* — HOWSON & HOWSON LLP

(57) ABSTRACT

An abradable powder composition is includes a metal component, a lubricant component, and a polymer component. A portion of the metal component is wrapped in the lubricant component to achieve high lubricity and abradability. The abradable powder composition can be used to form an abradable seal coating provided for use in a turbo machinery having a housing and a wheel having multiple blades. The housing houses the wheel which rotates therein. The seal coating is formed on the inner walls of housing adjacent where the wheel blades pass during their rotation. When the wheel is rotated such that, the blades contact the seal coating, it is abraded to form a close fit gap. The abradable seal coating preferably does not produce significant wear of the blade tips or transfer abradable material significantly to the blade tips upon being abraded.

20 Claims, 2 Drawing Sheets

(51) Int. Cl.
*B22F 3/115* (2006.01)
*C09D 5/03* (2006.01)
*C09D 133/06* (2006.01)
*C22C 1/04* (2023.01)
*F01D 11/12* (2006.01)

(52) U.S. Cl.
CPC .......... C09D 133/06 (2013.01); C22C 1/0416 (2013.01); F01D 11/122 (2013.01); *Y10T 428/12736* (2015.01)

(58) Field of Classification Search
CPC ........ B22F 1/105; B22F 2998/10; B22F 1/12; C09D 5/032; C09D 133/06; C22C 1/0416; F01D 11/122; F01D 5/20; F01D 5/288; Y10T 428/12736; F02B 77/02; F04D 29/023; F04D 29/162; F05D 2250/241; F05D 2300/11; F05D 2300/121; F05D 2300/1614; F05D 2300/173; F05D 2300/224; F05D 2300/2282; F05D 2300/2291; F05D 2300/509; F05D 2220/40; F05D 2300/61; F05D 2240/307; F05D 2300/1616; F05D 2300/229; F05D 2300/43

See application file for complete search history.

(56) References Cited

U.S. PATENT DOCUMENTS

| | | |
|---|---|---|
| 5,434,210 A | 7/1995 | Rangaswamy et al. |
| 5,631,044 A * | 5/1997 | Rangaswamy ........... C23C 4/08 427/217 |
| 7,582,362 B2 | 9/2009 | Fiala et al. |
| 9,103,013 B2 | 8/2015 | Dorfman et al. |
| 2004/0112174 A1 | 6/2004 | Le Biez et al. |
| 2005/0281668 A1 | 12/2005 | Nava et al. |
| 2010/0124616 A1* | 5/2010 | Rosenzweig ............. C23C 4/18 427/535 |
| 2012/0063888 A1* | 3/2012 | Strock ................. C23C 28/3215 428/335 |
| 2012/0295825 A1* | 11/2012 | Dorfman ............. C22C 32/0068 508/151 |
| 2018/0298480 A1 | 10/2018 | Miyamoto |
| 2019/0048454 A1 | 2/2019 | Schuster |
| 2021/0180173 A1* | 6/2021 | Szyndelman ...... B23K 35/3612 |

FOREIGN PATENT DOCUMENTS

| | | |
|---|---|---|
| JP | 2010-126786 A | 6/2010 |
| WO | 2019/118708 A1 | 6/2019 |

* cited by examiner

METHOD FOR MAKING HIGH LUBRICITY ABRADABLE MATERIAL AND ABRADABLE COATING

CROSS REFERENCE TO RELATED APPLICATIONS

This application is a continuation of co-pending U.S. application Ser. No. 17/007,820 filed Aug. 31, 2020.

TECHNICAL FIELD

The present disclosure relates generally to composite abradable powder materials with high lubricity. More specifically, this disclosure relates to composite abradable powder materials that can be applied as coatings to form abradable seals for turbo machineries.

BACKGROUND

Materials which abrade readily in a controlled fashion are used in a number of applications, including as abradable seals for clearance control. As will be appreciated by those skilled in the art, contact between a moving part and a fixed abradable seal causes the abradable material to erode in a configuration which closely mates with and conforms to the moving part at the region of contact so that the seal takes on a geometry which precisely fits the moving part, i.e., a close clearance gap. This effectively forms a seal having an extremely close tolerance.

One particular application of abradable seals is their use in axial or centrifugal flow turbo machineries, or turbines. Such turbines typically have a rotating compressor or rotor that includes a plurality of blades attached to a shaft which is mounted in a housing. In operation, the shaft and blades rotate inside the housing. As will be appreciated by those skilled in the art, it is important to reduce back flow in turbines to increase and/or maximize turbine efficiency. This is achieved by reducing and/or minimizing the clearance between the blade tips and the inner wall of the housing. Ideally, the housing would be manufactured with the minimum clearance between its inner wall and the blade tips. However, there are practical reasons that this is not done. For example, as the turbine blades rotate, they expand somewhat due to the heat that is generated. Thus, during operation the blades could contacting the housing wall due to this thermal expansion. Because these components are typically made out of hard materials such as metals, and the turbine components rotate with a high frequency, contact between the various components during operation can result in damage to the blades. To avoid such damage to the blades as a result of contact with the housing, the housing is often manufactured with a greater clearance between its inner wall and the blade tips. However, there is still a desire to maximize turbine efficiency by minimizing the clearance.

Thus, to increase and/or maximize turbine efficiency without the minimum clearance between the housing and the blades, the inner surface of the housing is coated with an abradable material to serve as a pseudo-inner wall comprised of an abradable coating. The abradable coating is produced such that the initial placement of the shaft and blade assembly in the housing results in the blade tips being arranged as close as possible to the abradable coating. As the turbine blades rotate and expand due to heat, the rotating blade tips contact the abradable material and carve precisely defined grooves in the coating without contacting the housing itself. It will be understood that these grooves provide the clearance necessary to permit the blades to rotate at elevated temperatures and thus provide a custom-fitted seal for the turbo machinery.

In other gas turbines, the initial clearance is somewhat greater and the abradable coating is intended to protect the housing and blade tips against wear during transient conditions (e.g., power surges).

In order for the turbine blades to cut grooves in the abradable coating, the material from which the coating is formed preferably abrades relatively easily without wearing down the blade tips. Additionally, the abradable seal material is preferably not transferred to the blade tips upon abrading. However, the coating should have a high enough structural integrity to maintain its shape but for the abraded material. This requires a careful balance of materials in the coatings. Furthermore, in the environments in which the abradable coating is used, it should exhibit good resistance against particle erosion and other degradation at elevated temperatures. As known by those skilled in the art, however, these desirable characteristics have been difficult to obtain.

Therefore, it would be desirable to provide a composite material which abrades readily without producing significant wear of rotating parts while otherwise maintaining its structural integrity in harsh environments, such as in gas turbines. It would also be desirable to provide such a material which can be fabricated using conventional thermal spray techniques, such as air plasma or flame spray techniques. It would still further be desirable to provide such a coating which could be used to form abradable seals in relatively low-temperature environments wherein the seal material does not adhere to rotating parts.

The present disclosure achieves these goals by providing composite powder materials which contain a metal component, a lubricant component, and a polyester component.

SUMMARY

In one aspect, a composite abradable powder composition is provided which includes a metal component, a lubricant component, and a polymer component. A portion of the metal component is wrapped in the lubricant component.

In another aspect, an abradable seal coating is provided for use in a turbo machinery having a housing and a wheel having multiple blades. The housing houses the wheel which rotates therein. The seal coating is formed on the inner walls of housing adjacent where the wheel blades pass during their rotation. When the wheel is rotated such that, the blades contact the seal coating, it is abraded to form a close fit gap. The abradable seal coating preferably does not produce significant wear of the blade tips or transfer significantly to the blade tips upon being abraded. The abradable seal coating is formed from the abradable coating material above.

DETAILED DESCRIPTION

Figure 1:
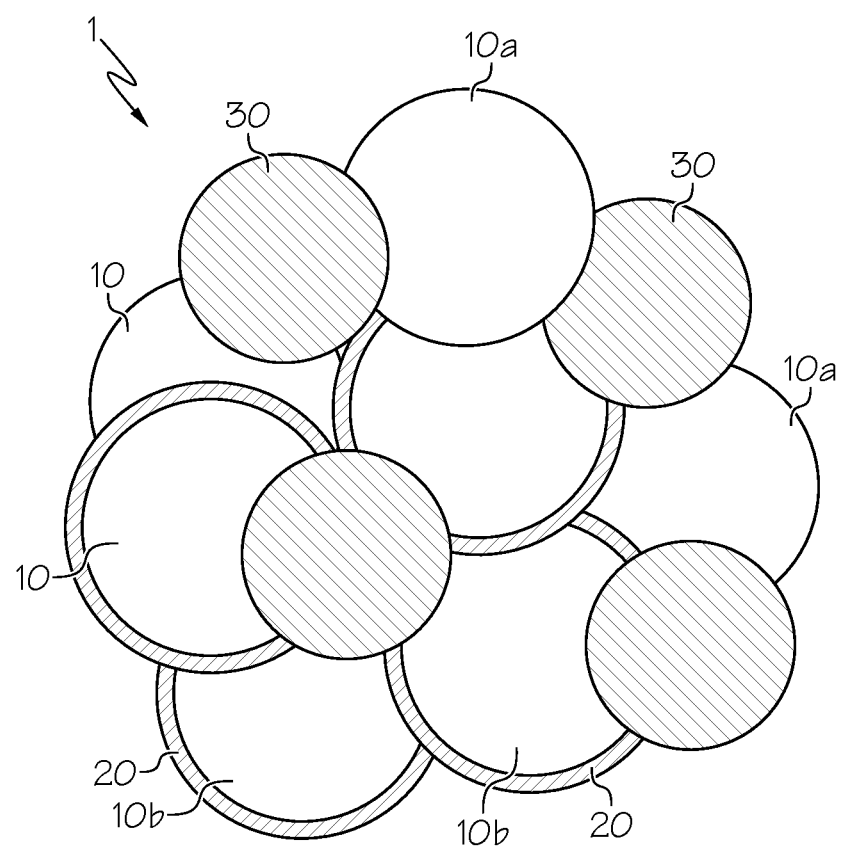
FIG. 1 illustrates a schematic representation of a composite powder material for high lubricity and abradability in accordance with the present disclosure.

In a first preferred embodiment, an abradable powder composition is provided that includes a metal component, a lubricant component, and a polyester component, wherein a portion of the metal component is wrapped in the lubricant component. That is, some, but not all, of the metal is wrapped in the lubricant. The composition thus generally includes three components: polyester, lubricant-wrapped metal, and unwrapped metal. This lubricant-wrapped metal component can be produced using a mechanical milling, chemical deposition, chemical vapor deposition (CVD), or physical vapor deposition (PVD) process.

The metal component can be a metal or a metal alloy. Preferred metal components include aluminum or an aluminum alloy, such as aluminum silicon alloy (silumin) or aluminum bronze alloy. The metal component in the powder composition is preferably in the form of metal particles, and are preferably aluminum particles or aluminum alloy particles. In addition to aluminum and silicon, silumin can also contain other metals, such as magnesium and copper. Similarly, in addition to aluminum and copper, aluminum bronze can also contain other metals, such as iron, nickel, cobalt, manganese, silicon, tin, and zinc. Other metal alloys can also include iron, nickel, cobalt, manganese, silicon, tin, or zinc. The metal components are preferably present as at least 50 by weight of the total powder composition.

The lubricant component can be any suitable dry lubricant. Preferably lubricant materials include boron nitride such as hexagonal boron nitride, molybdenum disulfide, graphite, tungsten disulfide, or molybdenum diselenide. Mixtures of multiple lubricant materials, including but not limited to the preferred lubricants above, can be used as the lubricant component. The lubricant component is preferably present as at least 1 wt. % of the total powder composition.

The polymer component can be any suitable polymer, include copolymers. Preferred polymers include polyester. The preferred polyester is poly(oxy-1,4-phenylenecarbonyl). The polymer component is preferably present as at least 5 wt. % of the total powder composition.

To provide advantageous properties for coatings produced therefrom, the powder composition is preferably made up of a portion of the metal component wrapped in the lubricant component, the remaining portion of the metal component unwrapped, and the polyester component. Preferably, the powder composition includes 50 to 94 wt. % of the metal component, 1 to 10 wt. % of the lubricant component, and 5 to 40 wt. % of the polymer component. Preferably, at least 20% by weight of the metal component is wrapped in the lubricant component. More preferably, at least 20% by weight of the metal component is wrapped with lubricant and has less than 30% by surface of exposed metal component.

A coating produced from the powder composition described above has numerous properties that are advantageous to use as an abradable seal coating. For example, the hardness is relatively low of the powder material and thus abradable seals produced therefrom, which prevents significant wear of a moving component that engages seals, such as the blade tips of a turbo machinery. By preventing significant wear, it is meant that the moving component is not damaged in a way that materially affects its performance or performance lifetime. Weak bonding between the individual lubricant-wrapped metal component particles contributes to the relatively low hardness. The powder material and abradable seal coatings produced therefrom also have good lubricity, which also helps to prevent significant wear of the moving component and reduces material to transfer to the moving component. The powder material and abradable seal coatings produced therefrom also have a good balance between coating integrity and abradability, resulting in the seal abrading easily when contacted with the moving component while at the same time being held together with strong enough bonds such that the seal maintains its structure, particularly in harsh environments. The balance between coating integrity and abradability is achieved by the bonding between the materials. The polymer material particularly contributes to the abradability while the unwrapped metal component contributes to the coating integrity.

To form the powder material, particles of the metal component are wrapped in a phase of the lubricant component using a mechanical or chemical process in a first step. The lubricant phase/film on metal or its alloy particles will provide a non-stick or weak bonding between the particles, and also provide lubricity property into the material. The first property will aim to improve abradable property, and the second property to lubricity. In a second step, additional particles of the metal component are mixed with the lubricant-wrapped metal component particles to create a mixture of wrapped metal and unwrapped metal. This mixture of material will ensure the resultant coating has good mechanical properties, abradable properties and coating integrity. In a third step, to further improve abradability, particles of the polymer component are added to the mixture of lubricant-wrapped metal particles and unwrapped metal particles by a blending process to produce the powder composition. In a fourth step, the powder can be sprayed with conventional thermal spray techniques, such as by air plasma or flame, onto a surface to produce a coating thereon.

An example of a powder composition 1 is shown schematically in FIG. 1 that includes a metal component 10, a lubricant component 20, and a polymer component 30. A portion of the metal component 10 is formed as unwrapped metal component 10a, whereas the remainder of the metal component 10 is wrapped with lubricant 20 to form wrapped metal component 10b.

Figure 2:
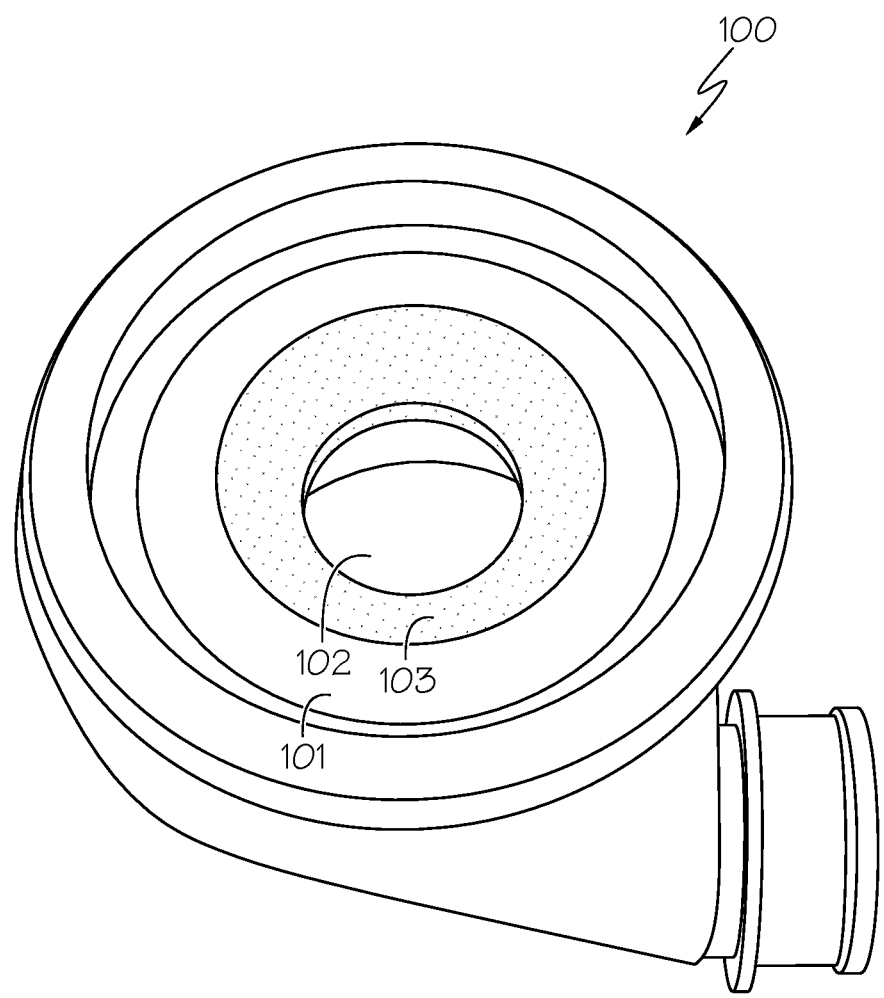
FIG. 2 is a perspective view of a turbocharger compressor housing with an abradable seal coating formed on inner surface of thereof in accordance with the present disclosure.

The powder material is suitable to be used as an abradable seal coating for maximizing the efficiency of an axial or centrifugal turbo machinery. FIG. 2 depicts an example turbo machinery, specifically a turbocharger, 100 that includes a housing 101 having inner walls that define an open interior 102 designed to contain a wheel having blades (not pictured) that rotates therein. An abradable seal coating 103 is formed on the inner walls of the housing 101. The abradable seal coating is prepared from the powder composition 1 discussed above. The powder composition 1 is applied as a coating to the inner walls of the housing 101 adjacent where the wheel blades pass during their rotation to form the abradable seal coating 103. Conventional thermal spray techniques can be used to produce the coating in the turbo machinery housing to form the abradable seal coating. Air plasma or flame spray are examples of spray techniques to produce the coatings. Upon rotation, the blades of the wheel contact the abradable seal coating 103 such that it is abraded to form a seal having close fit gap. The close fit gap reduces backflow in the turbo machinery.

The abradable seal coating 103 preferably does not produce significant wear of the blade tips. To achieve this, the hardness of the abradable seal coating 103 on the R15Y scale is preferably less than 70, more preferably less than 60, and most preferably less than 50. Preferably, a minimal portion of the abradable seal that abrades adheres to the blade tips upon abrading. Preferably 3%, more preferably 2%, and even more preferably 1% of the abraded portion of the seal adheres to the blade tips after it is abraded.

When ranges are expressed herein, it is to be appreciated that other embodiments include any subranges and values encompassed therein. For example, the range of 10 to 20% encompasses 10 to 15%, 12 to 17%, 13 to 20%, and so forth.

The invention claimed is:

1. A method of making an abradable coating, comprising the steps of:
   providing a powder composition comprising particles of a metal component, a lubricant component, and particles of a polymer component; and
   thermal spraying the powder composition onto a substrate;
   wherein the metal component is at least 50% by weight of the powder composition and the lubricant component is 1% to 10% by weight of the powder composition;
   wherein each particle within a first subset of the particles of the metal component of the powder composition consists of the metal component wrapped in the lubricant component and each particle within a second subset of the particles of the metal component of the powder composition consists of the metal component free of the lubricant component; and
   wherein the powder composition is produced by mixing the first subset with the second subset and then mixing therewith the particles of the polymer component which consist entirely of the polymer component.

2. A method of making a seal for turbo machinery having a housing with inner walls that define an open interior suitable for containing a rotatable component, the method comprising the steps of:
   providing a powder composition comprising particles of a metal component, a lubricant component, and particles of a polymer component; and
   spraying the powder composition onto at least a portion of the inner walls of the housing of the turbo machinery to form an abradable coating thereon;
   wherein the metal component is at least 50% by weight of the powder composition and the lubricant component is 1% to 10% by weight of the powder composition;
   wherein each particle within a first subset of the particles of the metal component of the powder composition is consists of the metal component wrapped in the lubricant component and each particle within a second subset of the particles of the metal component of the powder composition consists of the metal component free of the lubricant component; and
   wherein the powder composition is produced by mixing the first subset with the second subset and then mixing therewith the particles of the polymer component which consist entirely of the polymer component.

3. The method according to claim 2, wherein the turbo machinery is a turbocharger.

4. The method according to claim 2, wherein the abradable coating has a hardness R15Y of less than 70.

5. The method according to claim 2, wherein the abradable coating has a hardness R15Y of less than 50.

6. The method according to claim 2, wherein the metal component is aluminum or an aluminum alloy.

7. The method according to claim 2, wherein the metal component is an aluminum alloy comprising aluminum and silicon or copper.

8. The method according to claim 2, wherein the metal component is a metal or an alloy comprising iron, nickel, cobalt, manganese, silicon, tin or zinc.

9. The method according to claim 2, wherein the lubricant component comprises hexagonal boron nitride, molybdenum disulfide, graphite, tungsten disulfide, molybdenum diselenide, or mixtures thereof.

10. The method according to claim 2, wherein the polymer component is 5 to 40% by weight of the composition.

11. The method according to claim 2, wherein the polymer component comprises a polyester.

12. The method according to claim 1, wherein the coating has a hardness R15Y of less than 70.

13. The method according to claim 1, wherein the coating has a hardness R15Y of less than 60.

14. The method according to claim 1, wherein the coating has a hardness R15Y of less than 50.

15. The method according to claim 1, wherein the metal component is aluminum or an aluminum alloy.

16. The method according to claim 1, wherein the metal component is an aluminum alloy comprising aluminum and silicon or copper.

17. The method according to claim 1, wherein the metal component is a metal or an alloy comprising iron, nickel, cobalt, manganese, silicon, tin or zinc.

18. The method according to claim 1, wherein the lubricant component comprises hexagonal boron nitride, molybdenum disulfide, graphite, tungsten disulfide, molybdenum diselenide, or mixtures thereof.

19. The method according to claim 1, wherein the polymer component is 5 to 40% by weight of the composition.

20. The method according to claim 1, wherein the polymer component comprises a polyester.

* * * * *